(12) United States Patent
Kurokawa et al.

(10) Patent No.: US 10,268,089 B2
(45) Date of Patent: Apr. 23, 2019

(54) DISPLAY DEVICE AND METHOD

(71) Applicant: Japan Display Inc., Minato-ku (JP)

(72) Inventors: Tae Kurokawa, Tokyo (JP); Akira Sakaigawa, Tokyo (JP); Masaaki Kabe, Tokyo (JP); Kojiro Ikeda, Tokyo (JP); Amane Higashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 601 days.

(21) Appl. No.: 14/717,289

(22) Filed: May 20, 2015

(65) Prior Publication Data

US 2015/0346563 A1    Dec. 3, 2015

(30) Foreign Application Priority Data

May 30, 2014    (JP) .................................. 2014-112476

(51) Int. Cl.
*G02F 1/1335* (2006.01)
*G02F 1/1343* (2006.01)

(52) U.S. Cl.
CPC .. *G02F 1/134336* (2013.01); *G02F 1/133606* (2013.01); *G02F 2001/133607* (2013.01); *G02F 2001/134345* (2013.01)

(58) Field of Classification Search
USPC ............................. 349/61–67; 362/600–634
See application file for complete search history.

(56) References Cited

U.S. PATENT DOCUMENTS

| 5,724,108 A * | 3/1998 | Shibata ................ G02B 6/0053 349/62 |
| 7,362,393 B2 * | 4/2008 | Kim .................. G02F 1/133514 349/106 |
| 8,624,943 B2 | 1/2014 | Noguchi et al. |

(Continued)

FOREIGN PATENT DOCUMENTS

| JP | 2006-47775 A | 2/2006 |
| JP | 2006-267547 | 10/2006 |

(Continued)

OTHER PUBLICATIONS

Japanese Office Action dated Oct. 3, 2017 in Japanese Patent Application No. 2014-112476, citing document AO and AP therein, 11 pages (with English translation).

*Primary Examiner* — Edward J Glick
*Assistant Examiner* — David Y Chung
(74) *Attorney, Agent, or Firm* — Oblon, McClelland, Maier & Neustadt, L.L.P.

(57) ABSTRACT

According to one embodiment, a display device includes a display panel, a light source, a light guide and a prism sheet. The display panel includes a display area in which unit pixels each containing first sub-pixels and second sub-pixels are arranged along a first direction and a second direction. In the display area, the first sub-pixels have a width different from that of the second sub-pixel in at least one of the first direction and the second direction, or each unit pixel contains different numbers of first sub-pixels and second sub-pixels. The prism sheet is interposed between the light guide (Continued)

and the display panel and includes prisms extending along a third direction inclined with respect to the second direction by an acute angle of inclination.

6 Claims, 9 Drawing Sheets

(56) References Cited

U.S. PATENT DOCUMENTS

| | | | |
|---|---|---|---|
| 2005/0052590 A1* | 3/2005 | Ochiai | G02B 6/0068 349/71 |
| 2007/0279552 A1* | 12/2007 | Olczak | G02B 6/0053 349/95 |
| 2009/0002592 A1* | 1/2009 | Ma | G02B 6/0053 349/56 |
| 2009/0079905 A1* | 3/2009 | Kimura | G02B 6/0053 349/62 |
| 2011/0234949 A1* | 9/2011 | Matsui | G02F 1/133512 349/106 |
| 2013/0135845 A1 | 5/2013 | Matsui et al. | |
| 2016/0054507 A1* | 2/2016 | Hirayama | G02B 6/0053 349/65 |

FOREIGN PATENT DOCUMENTS

| | | |
|---|---|---|
| JP | 2007-264393 | 10/2007 |
| WO | WO 2006/075564 A1 | 7/2006 |

\* cited by examiner

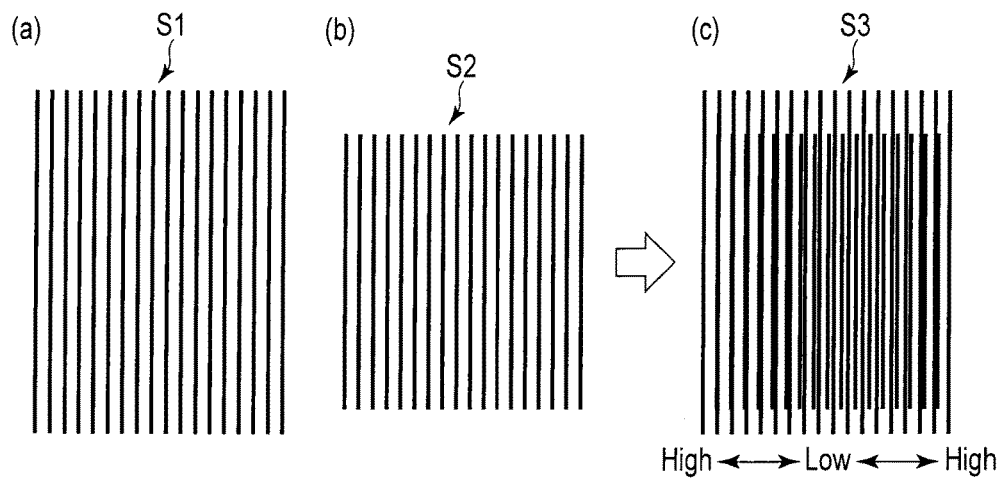
F I G. 11
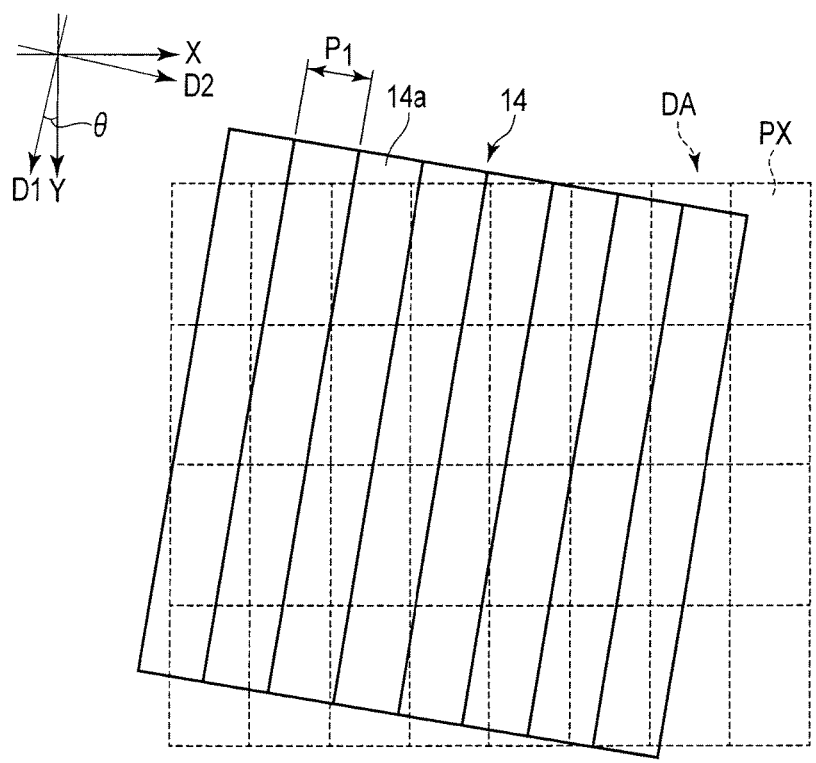
F I G. 12

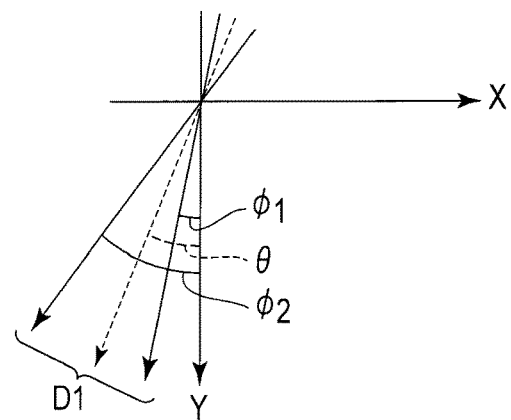
F I G. 13
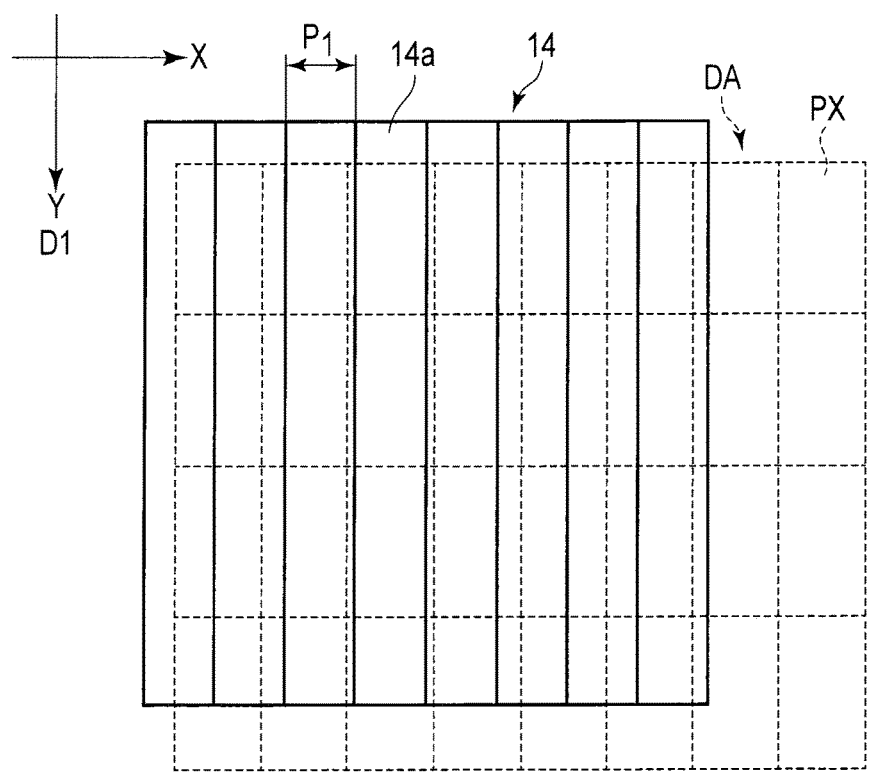
F I G. 14

DISPLAY DEVICE AND METHOD

CROSS-REFERENCE TO RELATED APPLICATIONS

This application is based upon and claims the benefit of priority from Japanese Patent Application No. 2014-112476, filed May 30, 2014, the entire contents of which are incorporated herein by reference.

FIELD

Embodiments described herein relate generally to a display device and a method of suppressing moirés.

BACKGROUND

Display devices such as liquid crystal display devices comprise a display panel including a display area in which unit pixels comprising a plurality of types of subpixels corresponding to respective different colors are arranged in matrix, and a prism sheet interposed between the display panel and the light source.

The prism sheet comprises, for example, linearly extending prisms arranged parallel to each other at a predetermined pitch. When light from the light source passes through the prism sheet, the light is concentrated in a predetermined range by each of the prisms to create shades corresponding to the prisms, respectively. These shades sometimes interfere with the subpixels in the display area to create the so-called moiré on the screen of the liquid crystal display device.

An object of an embodiment disclosed here is to suppress moiré caused by subpixels of a display area and a prism sheet.

BRIEF DESCRIPTION OF THE DRAWINGS

FIG. 11 is a diagram showing an example of moiré produced by interference between a prism sheet and a display area.

FIG. 12 is a diagram schematically showing a first prism sheet in which prisms are arranged, and a display area in which unit pixels are arranged, according to the first embodiment.

FIG. 13 is a diagram illustrating an example of a procedure which determines the angle of inclination of the prisms according to the first embodiment.

FIG. 14 is a diagram schematically showing a first prism sheet in which prisms are arranged, and a display area in which unit pixels are arranged, according to the second embodiment.

DETAILED DESCRIPTION

Generally, according to one embodiment, a display device comprises a display panel, a light source, a light guide and a prism sheet. The display panel includes a display area in which unit pixels are arranged along a first direction and a second direction intersecting the first direction, each unit pixel comprising a plurality of types of sub-pixels including at least one first sub-pixel displaying a first color and at least one second sub-pixel displaying a second color different from the first color, the first sub-pixel having a width different from that of the second sub-pixel in at least one of the first direction and the second direction, or each pixel containing different numbers of first sub-pixels and second sub-pixels. The light guide comprises an end portion opposing the light source. The prism sheet is interposed between the light guide and the display panel and comprises a plurality of prisms extending along a third direction inclined with respect to the second direction by an acute angle of inclination.

According to another embodiment, when the prism pitch by which a luminance distribution of the sub-pixels in the display area is in a most uniform state is defined as an ideal pitch, each of the plurality of types of sub-pixels has a specific ideal pitch, and the prism pitch is an average of the ideal pitches of at least two of the plurality of types of sub-pixels.

Embodiments will now be described with reference to accompanying drawings.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and Figures of the present application, structural elements having the same or similar functions will be referred to by the same reference numbers and detailed explanations of them that are considered redundant may be omitted.

In this embodiment, a liquid crystal display device is disclosed as an example of the display device. This liquid crystal display device can be used in various devices such as smartphone, tablet, mobile phone, notebook computer, and game console.

Figure 1:
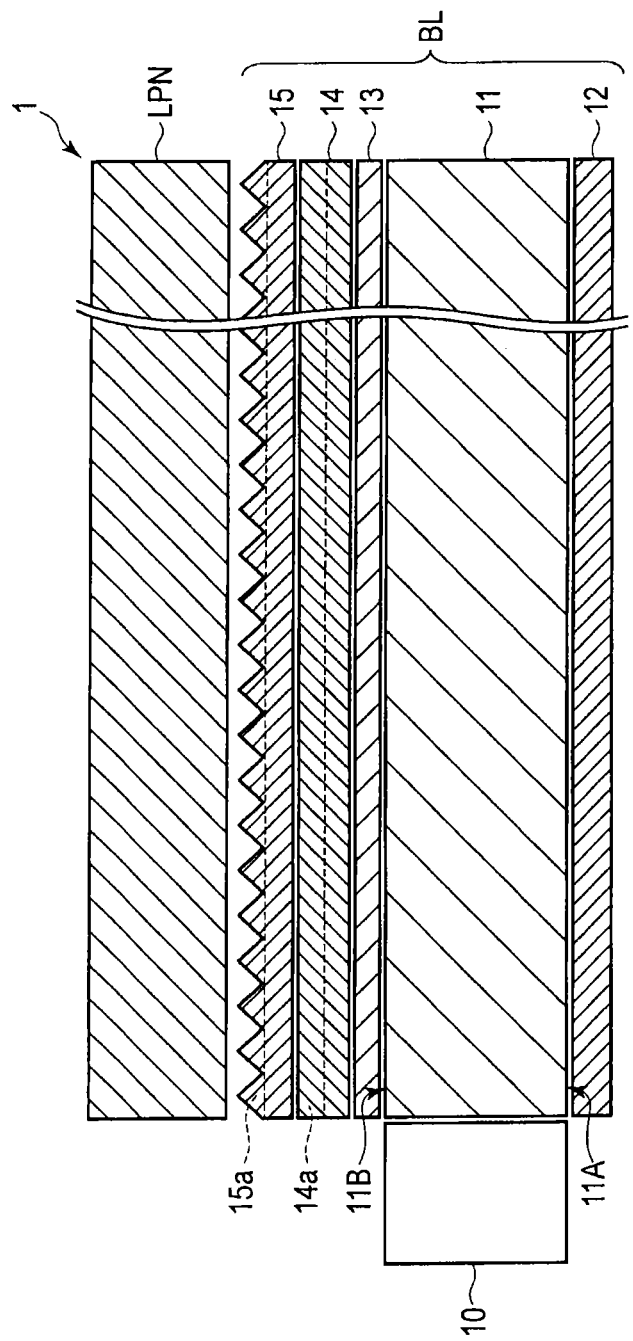
FIG. 1 is a cross sectional view schematically showing an example of the structure of a liquid crystal display device.

FIG. 1 is a cross-sectional view schematically showing an example of the structure of a liquid crystal display device 1. The liquid crystal display device 1 includes, for example, a backlight BL and a liquid crystal display panel LPN disposed on the backlight BL.

The backlight BL includes a light source 10 and a light guide 11. Further, the backlight BL includes a reflector 12 disposed in a first main surface 11A side of the light guide 11, a scattering sheet 13 disposed in a second main surface 11B side of the light guide 11, a first prism sheet 14 and a second prism sheet 15. The light guide 11, the scattering sheet 13, the first prism sheet 14 and the second prism sheet 15 have, for example, a rectangular shape of substantially the same dimensions, and these members are stacked mutually one another tightly in this order. The second prism sheet 15 opposes the liquid crystal display panel LPN.

The light source 10 comprises a number of point light sources arranged in a straight line, for example, at one end of the light guide 11. The point light sources are, for example, light-emitting diodes (LEDs) or organic electroluminescent elements (organic EL). The light source 10 may be a linear light source which employs a cold cathode fluorescence tube or a hot cathode fluorescent tube.

The light guide 11 receives light from the light source 10 and outputs uniform light from the second main surface 11B towards the scattering sheet 13. The reflector 12 reflects the light emitted from the first main surface 11A of the light guide 11 and returns it to the light guide 11.

The scattering sheet 13 diffuses the light from the second main surface 11B of the light guide 11 so that the luminance of light which enters the first prism sheet 14 becomes uniform. As the scattering sheet 13, for example, a type which has an irregular configuration which diffuses light on the surface or a type which contains fine particles or the like, which has a refractive index different from that of the base material can be used.

The first prism sheet 14 comprises a large number of prisms 14a each having, for example, a uniform sectional shape and extending linearly. The prisms 14a are formed on a side of the sheet 14, which opposes the second prism sheet 15. The second prism sheet 15 comprises a large number of prisms 15a each having, for example, a uniform sectional shape and extending linearly. The prisms 15a are formed on a side of the sheet 15, which opposes the liquid crystal display panel LPN. The sectional shape of each of prisms 14a and 15a is, for example, a triangle whose vertex angle is about 90 degrees. Each of prism 14a and 15a concentrates the spread angle of the light diffused by the scattering sheet 13 within a predetermined angle range. The first prism sheet 14 and the second prism sheet 15 are arranged so that, for example, prisms 14a and 15a extend in directions which intersect one another, for example, perpendicularly (directions in which ridgelines thereof extend).

Figure 2:
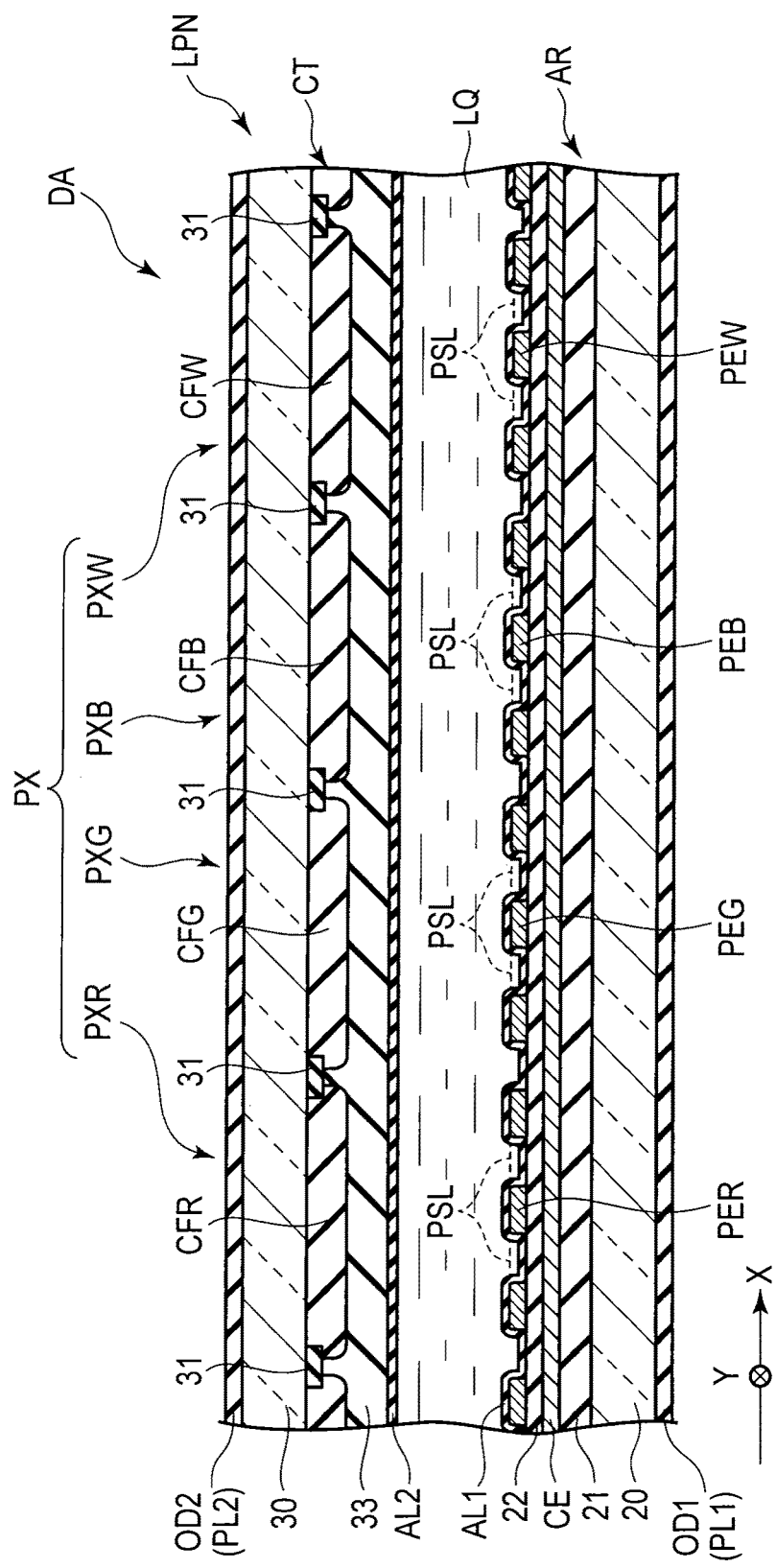
FIG. 2 is a cross sectional view schematically showing an example of the structure of a liquid crystal display panel.

FIG. 2 is a sectional view schematically showing an example of the structure of the liquid crystal display panel LPN. The liquid crystal display panel LPN includes a display area DA configured to display images. A unit pixel PX achieving color display contains a plurality of kinds of sub-pixels corresponding to different colors, respectively. The unit pixel PX is the minimum unit which constitutes a color image displayed on the display area DA. The example of FIG. 2 shows a structure of unit pixel PX in which sub-pixels PXR, PXG, PXB and PXW, respectively corresponding to red, green, blue and white are aligned in a first direction X.

The liquid crystal display panel LPN comprises an array substrate AR, a counter-substrate CT disposed to oppose the array substrate AR, and a liquid crystal layer LQ held between the array substrate AR and the counter-substrate CT.

The array substrate AR comprises a first insulating substrate 20 of a glass substrate, a resin substrate or the like, that has a light transmissivity, a first insulating layer 21 to cover an inner surface (, which is on the counter-substrate CT side) of the first insulating substrate 20, a common electrode CE disposed on the first insulating layer 21 and a second insulating layer 22 configured to cover the common electrode CE.

Further, the array substrate AR comprises pixel electrodes PER, PEG, PEB and PEW respectively corresponding to the sub-pixels PXR, PXG, PXB and PXW, and a first alignment film AL1 which covers the pixel electrodes PER, PEG, PEB and PEW and the second insulating layer 22 and is in contact with the liquid crystal layer LQ. The common electrode CE and the pixel electrodes PER, PEG, PEB and PEW oppose each other via the second insulating layer 22. In the example of FIG. 2, the pixel electrodes PER, PEG, PEB and PEW each comprising a plurality of slits PSL. The common electrode CE and the pixel electrodes PER, PEG, PEB and PEW are formed of, for example, a transparent conductive material such as indium tin oxide (ITO) or indium zinc oxide (IZO).

The counter-substrate CT comprises a second insulating substrate 30 of a glass substrate or a resin substrate, that has a light transmissivity and color filters CFR, CFG, CFB and CFW and a black matrix 31 provided on an inner surface (, which is on the array substrate AR side) of the second insulating substrate 30.

The color filter CFR is formed of a resin material colored red, for example and is arranged in the red sub-pixel PXR. The color filter CFG is formed of a resin material colored green, for example and is arranged in the green sub-pixel PXG. The color filter CFB is formed of a resin material colored blue, for example and is arranged in the blue sub-pixel PXB. The color filter CFW is formed of a resin material colored white, for example and is arranged in the white sub-pixel PXW. Note that the color filter CFW may not be formed of a transparent resin material, or the white sub-pixel PXW may not be provided with the color filter CFW.

The black matrix 31 is configured to separate the sub-pixel PXR, PXG, PXB and PXW from each other for compartmentalization. The boundaries of the color filters CFR, CFG, CFB and CFW are located above the black matrix 31.

The counter-substrate CT further comprises an overcoat layer 33 which covers the color filters CFR, CFG, CFB and CFW and the black matrix 31, and a second alignment film AL2 which covers the overcoat layer 33 and is in contact with the liquid crystal layer LQ. The overcoat layer 33 is formed, for example, of a transparent resin material.

On an outer surface (, which is on the backlight BL side) of the first insulating substrate 20, a first optical device OD1 containing a first polarizer PL1 is provided. On an outer surface (, which is on an opposite side to the array substrate AR), a second optical device OD2 containing a second polarizer PL2 is provided. The first polarization axis (or the first absorption axis) of first polarizer PL1 and the second polarization axis (or the second absorption axis) of second polarizer PL2 are situated to be, for example, perpendicular to each other in a crossed Nicol relationship.

Note that the structure shown in FIG. 2 is applicable to, as an example, a liquid crystal display panel LPN of a mode which utilizes lateral electric fields (including fringe electric field) for switching liquid crystal molecules. Note that the mode of the liquid crystal display panel LPN is not restricted to that utilizing lateral electric fields, but may be that utilizes vertical electric fields for switching of liquid crystal molecules such as a twisted nematic (TN) mode or vertically aligned (VA) mode.

In this embodiment, at least some of those types of sub-pixels differ from the others in shape or the number contained in a unit pixel PX. Here, the difference in the shape of a sub-pixel refers to that the width of the sub-pixel in at least one of the first direction X and the second direction Y perpendicular to the first direction X differs. Examples of the structures of such a unit pixel PX and display area DA will now be described with reference to FIGS. 3 to 10.

In each structural example, the unit pixel PX comprises red, green, blue and white sub-pixels PXR, PXG, PXB and PXW. Note that the unit pixel PX need not to include one or more of these sub-pixels, or may include a sub-pixel(s) of other color(s), for example, yellow in place thereof or in addition thereto.

Further, in each example, the widths of the sub-pixels PXR, PXG, PXB and PXW in the first direction X are defined as $W_{RX}$, $W_{GX}$, $W_{BX}$, and $W_{WX}$, respectively, and the widths of the sub-pixels PXR, PXG, PXB and PXW in the second direction Y are defined as $W_{RY}$, $W_{GY}$, $W_{BY}$, and $W_{WY}$, respectively. The display area DA comprises a plurality of unit pixels PX arranged in the first direction X and the second direction Y.

(First Structural Example)

Figure 3:
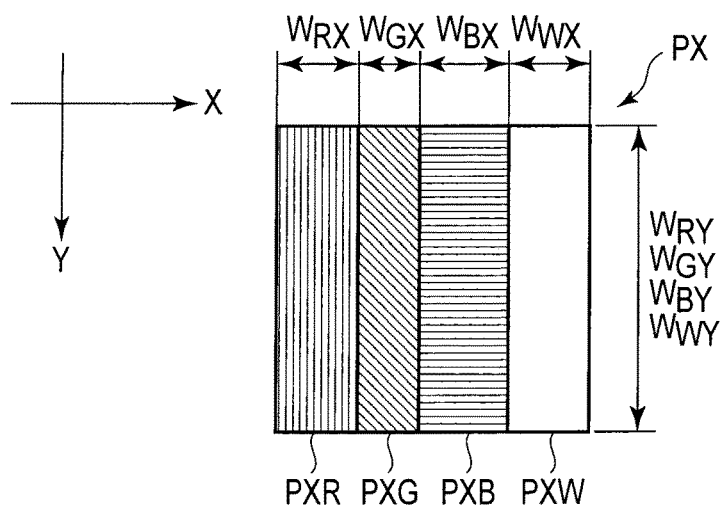
FIG. 3 is a diagram schematically showing a unit pixel of a first structural example.

FIG. 3 schematically shows a unit pixel PX according to the first structural example. In this unit pixel PX, sub-pixels PXR, PXG, PXB and PXW are arranged in the first direction X in this order.

The width $W_{GX}$ of the sub-pixel PXG in the first direction X is less than the width $W_{RX}$ of the sub-pixel PXR in the first direction X ($W_{GX}<W_{RX}$). The width $W_{BX}$ of the sub-pixel PXB in the first direction X is greater than the width $W_{RX}$ of the sub-pixel PXR in the first direction X ($W_{BX}>W_{RX}$). The width $W_{WX}$ of the sub-pixel PXW in the first direction X is equal to the width $W_{RX}$ of the sub-pixel PXR in the first direction X ($W_{WX}=W_{RX}$).

The widths $W_{RY}$, $W_{GY}$, $W_{BY}$, and $W_{WY}$ of the sub-pixels PXR, PXG, PXB and PXW in the second direction Y are equal ($W_{RY}=W_{GY}=W_{BY}=W_{WY}$).

Figure 4:
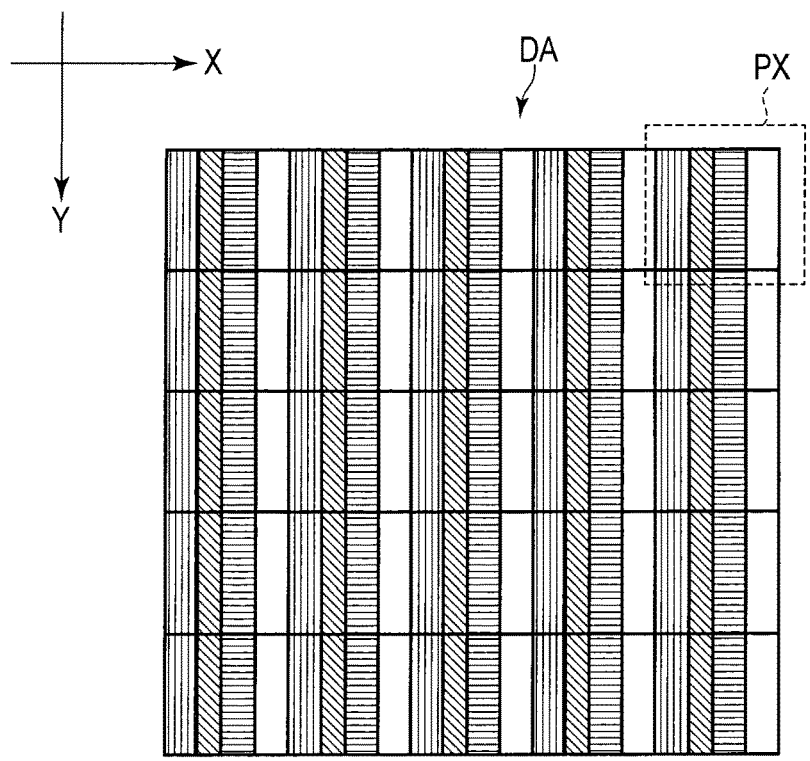
FIG. 4 is a diagram schematically showing an example of a display area in which unit pixels of the first structural example are arranged.

FIG. 4 schematically shows an example of display area DA in which unit pixels PX of the first structural example are arranged. This figure illustrates only a part of the display area DA. In the display area DA, unit pixels PX are arranged along the first direction X and the second direction Y so that the sub-pixels PXR, PXG, PXB and PXW are all located sequentially in the second direction Y.

(Second Structural Example)

Figure 5:
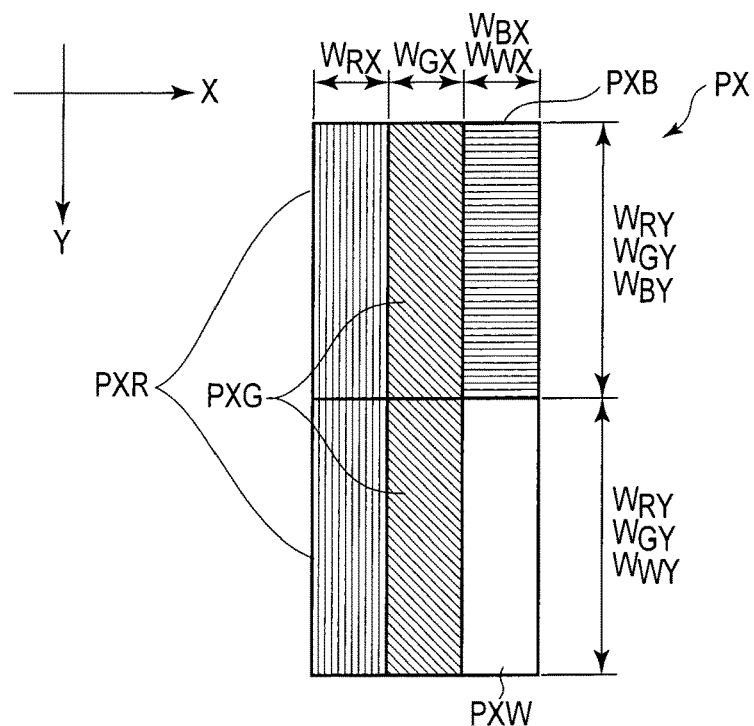
FIG. 5 is a diagram schematically showing a unit pixel of a second structural example.

FIG. 5 schematically shows a unit pixel PX according to the second structural example. In this unit pixel PX, two sub-pixels PXR of the same size are arranged in the second direction Y. In the first direction X, sub-pixels PXB and PXW are arranged in the second direction Y next to the two sub-pixels PXG, respectively.

The widths $W_{RX}$, $W_{GX}$, $W_{BX}$, and $W_{WX}$ of the sub-pixels PXR, PXG, PXB and PXW in the first direction X are equal ($W_{RX}=W_{GX}=W_{BX}=W_{WX}$). The widths $W_{RY}$, $W_{GY}$, $W_{BY}$, and $W_{WY}$ of the sub-pixels PXR, PXG, PXB and PXW in the second direction Y are equal ($W_{RY}=W_{GY}=W_{BY}=W_{WY}$).

Figure 6:
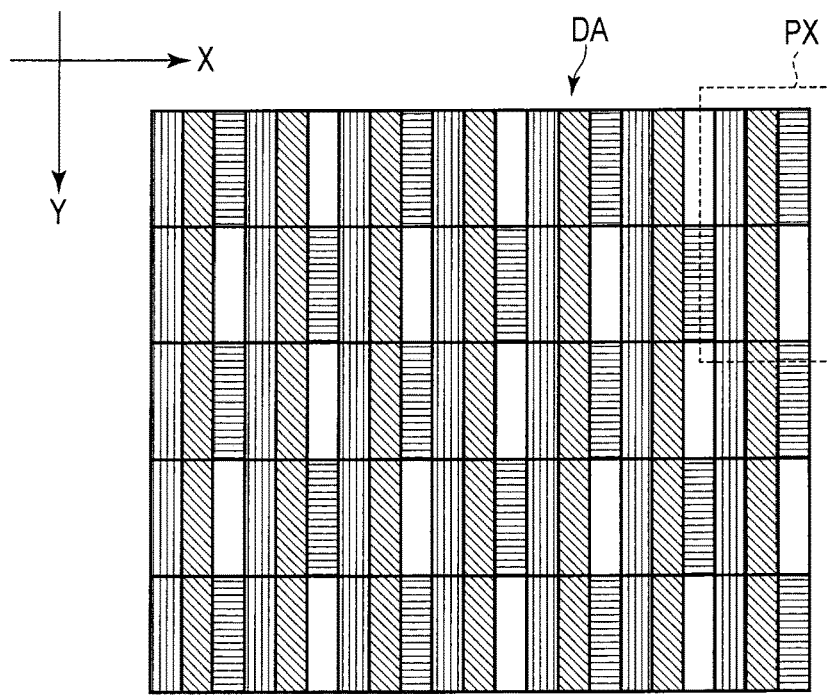
FIG. 6 is a diagram schematically showing an example of a display area in which unit pixels of the second structural example are arranged.

FIG. 6 schematically shows an example of display area DA in which unit pixels PX of the second structural example are arranged. This figure illustrates only a part of the display area DA. In the display area DA, unit pixels PX are arranged along the first direction X and the second direction Y so that the sub-pixels PXR and PXG are both located sequentially in the second direction Y. In two unit pixels PX next to each other in the first direction X, the locations of the sub-pixel PXB and PXW are replaced with each other.

(Third Structural Example)

Figure 7:
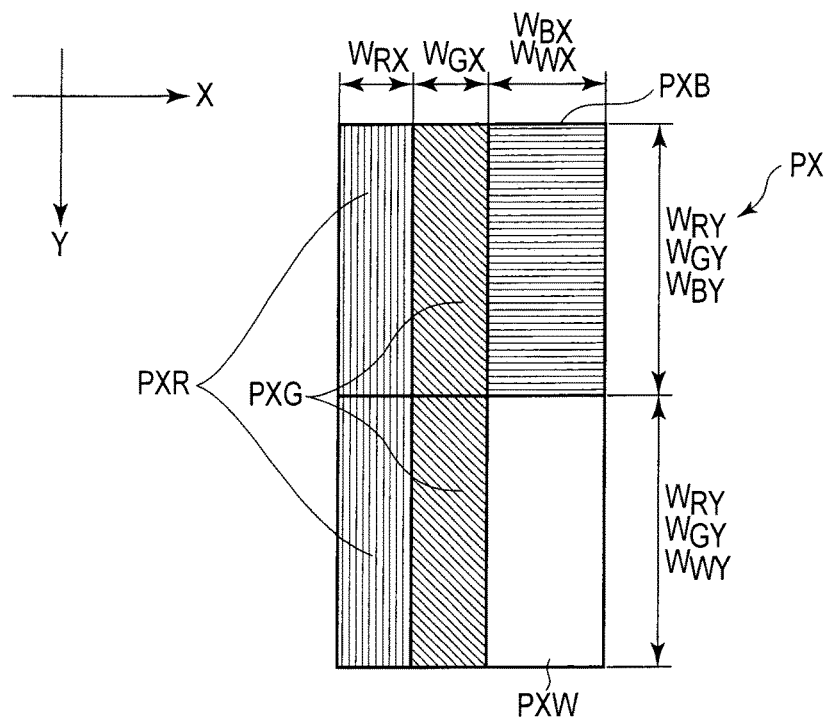
FIG. 7 is a diagram schematically showing a unit pixel of a third structural example.

FIG. 7 schematically shows a unit pixel PX according to the third structural example. In this unit pixel PX, the locations of sub-pixels PXR, PXG, PXB and PXW are the same as those of the second structural example.

The width $W_{GX}$ of the sub-pixel PXG in the first direction X is equal to the width $W_{RX}$ of the sub-pixel PXR in the first direction X ($W_{GX}=W_{RX}$). The width $W_{BX}$ of the sub-pixel PXB in the first direction X is equal to the width $W_{WX}$ of the sub-pixel PXW in the first direction X, and also they are greater than the width $W_{RX}$ of the sub-pixel PXR in the first direction X ($W_{BX}=W_{WX}>W_{RX}$).

The widths $W_{RY}$, $W_{GY}$, $W_{BY}$, and $W_{WY}$ of the sub-pixels PXR, PXG, PXB and PXW in the second direction Y are equal ($W_{RY}=W_{GY}=W_{BY}=W_{WY}$).

Figure 8:
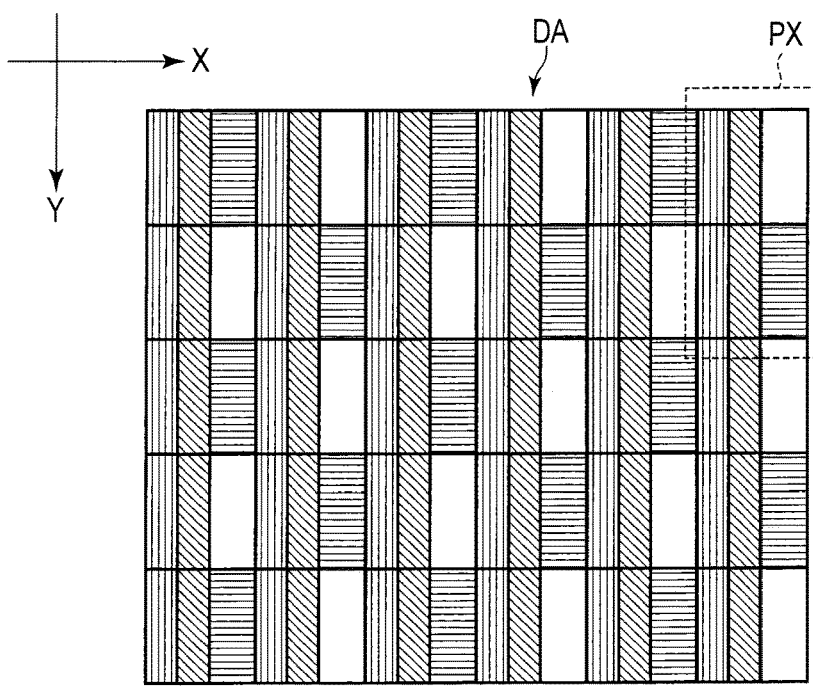
FIG. 8 is a diagram schematically showing an example of a display area in which unit pixels of the third structural example are arranged.

FIG. 8 schematically shows an example of display area DA in which unit pixels PX of the third structural example are arranged. This figure illustrates only a part of the display area DA. In the display area DA, unit pixels PX are arranged along the first direction X and the second direction Y so that the sub-pixels PXR and PXG are both located sequentially in the second direction Y. As in the second structural example, in two unit pixels PX next to each other in the first direction X, the locations of the sub-pixel PXB and PXW are replaced with each other.

(Fourth Structural Example)

Figure 9:
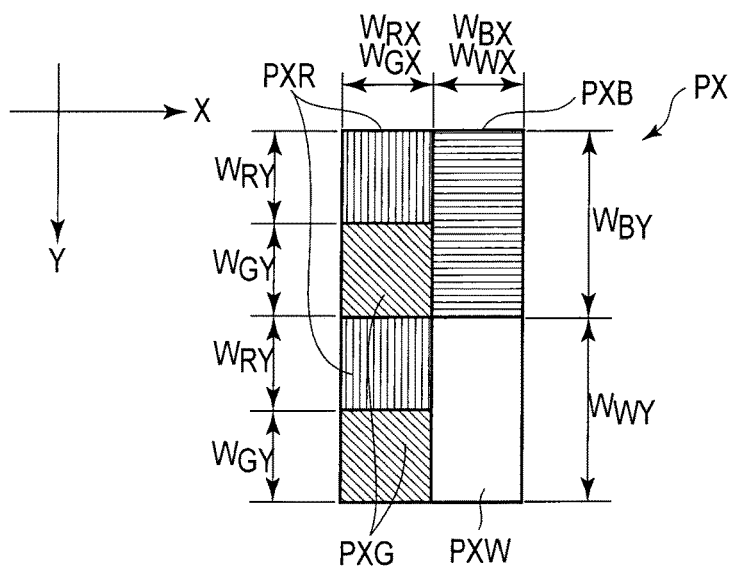
FIG. 9 is a diagram schematically showing a unit pixel of a fourth structural example.

FIG. 9 schematically shows a unit pixel PX according to the fourth structural example. In this unit pixel PX, two sub-pixels PXR of the same size and two sub-pixels PXG of the same size are arranged alternately in the second direction Y. In the first direction X, sub-pixels PXB and PXW are arranged in the second direction Y next to the two sub-pixels PXR and the two sub-pixels PXG, respectively.

The widths $W_{RX}$, $W_{GX}$, $W_{BX}$, and $W_{WX}$ of the sub-pixels PXR, PXG, PXB and PXW in the first direction X are equal ($W_{RX}=W_{GX}=W_{BX}=W_{WX}$).

The widths $W_{RY}$ and $W_{GY}$ of the sub-pixels PXR and PXG in the second direction Y are equal ($W_{RY}=W_{GY}$). The widths $W_{BY}$ and $W_{WY}$ of the sub-pixels PXB and PXW in the second direction Y are equal and about twice the width $W_{RY}$ ($W_{BY}=W_{WY}=2W_{RY}$).

Figure 10:
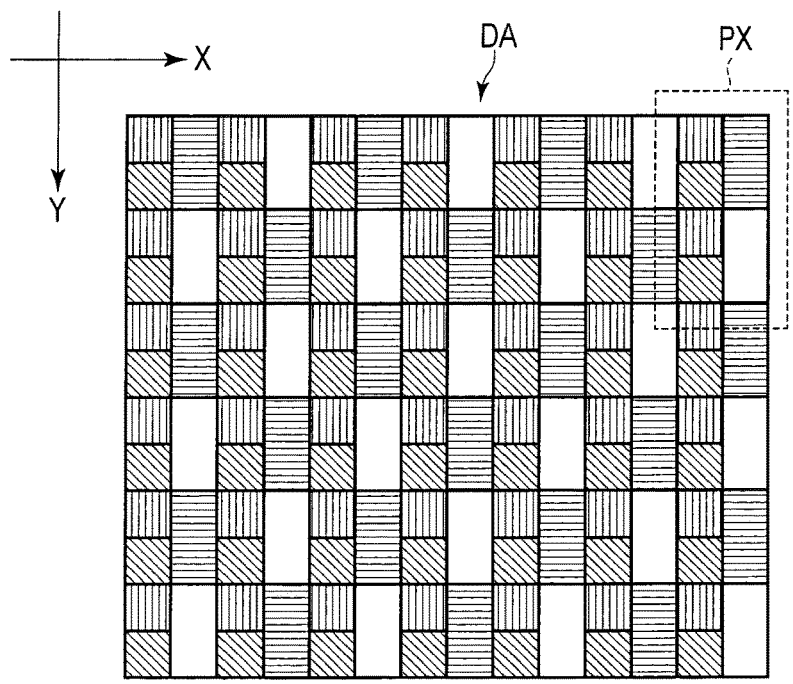
FIG. 10 is a diagram schematically showing an example of a display area in which unit pixels of the fourth structural example are arranged.

FIG. 10 schematically shows an example of display area DA in which unit pixels PX of the fourth structural example are arranged. This figure illustrates only a part of the display area DA. In the display area DA, unit pixels PX are arranged along the first direction X and the second direction Y. As in the second and third structural examples, in two unit pixels PX next to each other in the first direction X, the upper and lower locations of the sub-pixel PXB and PXW are replaced with each other.

Subsequently, an example of the moiré resulting from a prism sheet and a display area in a general liquid crystal display will now be described using FIG. 11.

When light from the light source passes through the prism sheet in which prisms are arranged at equal pitches, for example, stripe pattern S1 of a high-luminance part and a low-luminance part repeating alternately as shown in FIG. 11 (a) is produced. The low-luminance parts are indicated by solid lines and the high-luminance parts are regions between solid lines in the figure. The pitch of pattern S1 coincides with the pitch of the prisms. Further, when light from the light source passes through the display area where a group of sub-pixels of a certain color, linearly aligned in the first direction, are arranged with gaps therebetween at equal pitches in the second direction perpendicular to the first direction, stripe pattern S2 of a high-luminance part and a low-luminance part repeating alternately as shown in FIG. 11 (b) is produced. The pitch of pattern S2 coincides with the pitch of the sub-pixels in the second direction (the distance between two sub-pixels next to each other in the second direction).

When the display area is viewed from outside, pattern S3 in which patterns S1 and S2 overlaying one another as shown in FIG. 11 (c) is produced. In pattern S3, areas where low-luminance parts of patterns S1 and S2 overlay show a high luminance, and areas where low-luminance parts of patterns S1 and S2 do not overlap show a low luminance. Generally, the repetition cycle of the high-luminance part and the low-luminance part in patterns S1 and S2 is extremely short, the patterns S1 and S2 are hard to recognize by the naked eye. On the other hand, the repetition cycle in pattern S3 is longer than those of the patterns S1 and S2, the periodic repetition of the difference in luminance in pattern S3 is recognized as moiré when viewed.

Note that the moiré produced when the high-luminance parts and the low-luminance parts in patterns S1 and S2 are all parallel to each other is explained above with reference to FIG. 11. However, even if the high-luminance parts and the low-luminance parts in patterns S1 and S2 cross by an angle each other, the high-luminance parts and the low-luminance parts appear in pattern S3 and they can be recognized as moiré when viewed.

FIG. 12 illustrates an example of the method of suppressing such a moiré as described above. Here, a moiré resulting from the first prism sheet 14 is focused, and the first prism sheet 14 in which prisms 14a are arranged and the display area DA in which unit pixels PX are arranged are schematically shown. Prisms 14a are each extending linearly along first extending direction D1 (third direction) and arranged at first prism pitch $P_1$ parallel to each other along second extending direction D2 perpendicular to first extending direction D1.

First extending direction D1 of prisms 14a are inclined by an angle θ, which is an acute angle with respect to the second direction Y (0°<θ<90°). Here, since the first direction X is perpendicular to the second direction Y, first extending direction D1 is inclined by an acute angle of θ with respect to the first direction X as well (90°−θ).

Note that prisms 15a of the second prism sheet 15 extend along second extending direction D2. That is, second extending direction D2 are inclined with respect to the second direction Y by an acute angle (90°−θ). Further, since the first direction X is perpendicular to the second direction Y, second extending direction D2 is inclined with respect to the first direction X as well by an acute angle (θ).

The moiré which might have resulted from prisms of prism sheets and various types of sub-pixels can be suppressed by inclining the extending direction of the prisms with respect to the display area DA at an ideal angle φ specifically for each of these various sub-pixels. The ideal angle φ is an angle by which, for example, the luminancees of sub-pixels are made most uniform in the display area DA as a whole.

Ideal angles φ for the sub-pixels are substantially equal if the shapes and the number of the various sub-pixels contained in unit pixels are the same. Therefore, moiré can be inhibited by setting this angle to an angle of inclination θ.

On the other hand, when at least some of sub-pixels PXR, PXG, PXB and PXW differ in shape from each other in each unit pixel PX or the number of sub-pixels of one type is different from the number of those of another type in each unit pixel PX as in the first to fourth structural examples, ideal angles φ of the sub-pixels do not become the same. In this case, the ideal angle φ of the sub-pixels should be determined. FIG. 13 shows an example of such a procedure of determining the ideal angle.

[Procedure 1]

First, the first sub-pixel having the highest luminance and the second sub-pixel having the second highest luminance are selected from the various types of sub-pixels PXR PXG, PXB and PXW. Then, first ideal angle $\varphi_1$, which is an ideal angle φ specific to the first sub-pixel and second ideal angle $\varphi_2$, which is an ideal angle φ specific to the second sub-pixel are determined. FIG. 13 shows an example in which first ideal angle $\varphi_1$ is less than second ideal angle $\varphi_2$, but, in some other cases, first ideal angle $\varphi_1$ may be greater than second ideal angle $\varphi_2$.

Ideal angles $\varphi_1$ and $\varphi_2$ can be determined, for example, by simulation using a computer. In this simulation, for example, a first model of the pattern produced in the light which passed prisms 14a, and a second model of the pattern produced in the light which passed the display area DA in which only one type of the first sub-pixels and the second sub-pixels to be subjected to operation are arranged while being superimposed one on another on a virtual plane. Then, the degree of occurrence of moiré (that is, the presence/absence or strength of moiré, etc) is evaluated by changing the angle made between the first model and second model. The evaluation may be carried out by the naked eye while displaying the first model and second model on the screen, or by calculation of the luminance distribution appearing on the overlaid first model and second model. In such an evaluation, the angle (angle by which luminance distribution is made most uniform) by which moiré is inhibited most is defined as the ideal angle φ for the sub-pixel subjected to operation. By carrying out such a simulation and evaluation for both the first sub-pixel and second sub-pixel, ideal angles $\varphi_1$ and $\varphi_2$ can be determined.

[Procedure 2]

Then, the angle of inclination θ is determined based on each of ideal angles $\varphi_1$ and $\varphi_2$ determined in Procedure 1. The angle of inclination θ can be defined, for example, between ideal angles $\varphi_1$ and $\varphi_2$ ($\varphi_1$<θ<$\varphi_2$ or $\varphi_2$<θ<$\varphi_1$).

Near first ideal angle $\varphi_1$, the moiré produced by interference between the first sub-pixel and prisms 14a is suppressed further as the angle of inclination θ becomes closer to the first ideal angle $\varphi_1$. Similarly, near second ideal angle $\varphi_2$, the moiré produced by interference between the second sub-pixel and prisms 14a is suppressed further as the angle of inclination θ becomes closer to the second ideal angle $\varphi_2$.

Therefore, if the angle of inclination θ is defined between ideal angles $\varphi_1$ and $\varphi_2$, the moiré produced by interference between prisms 14a and the display area DA is suppressed on the whole as compared to the case where the angle of inclination θ is defined outside this range.

In addition, as the luminance of the sub-pixel is higher, the noticeability of moiré produced by interference between the sub-pixel and prism 14a becomes high. Therefore, by determining the angle of inclination θ using the ideal angles $\varphi_1$ and $\varphi_2$ for the first sub-pixel and the second sub-pixel, which have high luminance, it becomes possible to effectively suppress the occurrence of highly noticeable moirés.

As an example, the angle of inclination θ can be obtained by simply averaging the ideal angles $\varphi_1$ and $\varphi_2$ as indicated in the following Equation (1).

$$\theta=(\varphi_1+\varphi_2)/2 \quad (1)$$

As another example, the angle of inclination θ can be obtained by weighted average of the ideal angles $\varphi_1$ and $\varphi_2$ as indicated in the following Equation (2).

$$\theta(B_1\cdot\varphi_1+B_2\cdot\varphi_2)/(B_1+B_2) \quad (2)$$

In this Equation, $B_1$ represents the luminance of the first sub-pixel (the first luminance) and $B_2$ represents the luminance of the second sub-pixel (the second luminance). With use of the weighted average according to luminance, the angle of inclination θ can be determined to be close to the ideal angle φ of a sub-pixel with a highly noticeable moiré (sub-pixel with high luminance) and thus the moiré which might have resulted from the sub-pixel can be suppressed with priority.

The weighted average may be carried out using coefficient $C_1$ (first coefficient) and coefficient $C_2$ (second coefficient) other than the luminance $B_1$ or $B_2$ as in the Equation (3) below. As the coefficient C1, various parameters regarding the first sub-pixel can be used, apart from the luminance $B_1$, for example, the width of the first sub-pixel in the first direction X or second direction Y, or the number of the first sub-pixels contained in the unit pixel PX. As the coefficient $C_2$, various parameters regarding the second sub-pixel can be used, apart from the luminance $B_2$, for example, the width of the second sub-pixel in the first direction X or second direction Y, or the number of the second sub-pixels contained in the unit pixel PX.

$$\theta=(C_1\cdot\varphi_1+C_2\cdot\varphi_2)/(C_1+C_2) \quad (3)$$

The weighted average may be carried out using the values obtained by multiplying coefficient $C_1$ with luminance $B_1$ and coefficient $C_2$ with luminance $B_2$ as in the Equation (4) below.

$$\theta=(B_1\cdot C_1\cdot\varphi_1+B_2\cdot C_2\cdot\varphi_2)/(B_1\cdot C_1+B_2\cdot C_2) \quad (4)$$

Here, an example will now be described, in which how the authors of these embodiments determined the angle of inclination θ. That is, as to a display area DA in which the sub-pixel PXW had the highest luminance and the sub-pixel PXG had the second highest luminance, the angle of inclination θ was determined using the Equation (2) above. Then, the moiré resulting from the first prism sheet 14 in which the first extending direction D1 of prisms 14a were inclined with respect to the second direction Y by the determined angle, and the display area DA, was evaluated.

The ratio of the luminance $B_1$ of the sub-pixel PXW which is the first sub-pixel and the luminance $B_2$ of the sub-pixel PXG which is the second sub-pixel is expressed as: $B_1:B_2=1.5:1$. In Procedure 1 described above, the first ideal angle $\varphi_1$ of the sub-pixel PXW and the second ideal angle $\varphi_2$ of the sub-pixel PXG were obtained by simulation, and the first ideal angle $\varphi_1$ was 15° and the second ideal angle $\varphi_2$ was 28°.

In this case, by the Equation (2) provided above, $\theta=(1.5\cdot15°+1\cdot28°)/(1.5+1)\approx20°$ is obtained. When the first extending direction D1 of prisms 14a was inclined with respect to the second direction Y by the angle of inclination θ thus obtained (=20°), moiré was substantially not noticeable. In addition, under various conditions, the evaluation of moiré was carried out for angles of inclination θ determined using the Equations (1) to (4). In each case, the result indicated that the moiré was appropriately suppressed. Further, under such a condition that the second extending direction D2 was perpendicular to the first extending direction D1, the moiré by interference between prisms 15a of the second prism sheet 15 and the display area DA was also appropriately suppressed in each case.

As explained above, according to this embodiment, moiré caused by interference between the display area DA and the first prism sheet 14 or the second prism sheet 15 can be suppressed in the liquid crystal display 1 even if at least some of sub-pixels differ in shape from each other in each unit pixel or the number of sub-pixels of one type is different from the number of those of another type in each unit pixels PX among those arranged in the display area DA.

Note that in this embodiment, the angle of inclination θ is defined based on the relationship between the first extending direction D1 of prisms 14a of the first prism sheet 14 and the second direction Y, but it is alternatively possible to define the angle of inclination θ based on the relationship between the first extending direction D1 and the first direction X. Similarly, the angle of inclination θ may be defined based on the relationship between the second extending direction D2 of prisms 15a of the second prism sheet 15 and the first direction X1 or second direction Y.

Further, in this embodiment, the angle of inclination θ is determined using the first ideal angle φ1 of the first sub-pixel with the highest luminance and the second ideal angle φ2 of the second sub-pixel with the second highest luminance. But it is also possible to determine the angle of inclination θ using ideal angles φ of more sub-pixels. In other words, assuming that unit pixels PX each comprise n-types (n>=2) of sub-pixels, the angle of inclination θ can be determined based on the ideal angles φ of 2 or more but n or less types of sub-pixels.

For example, the angle of inclination θ may be determined using, in addition to the first sub-pixel and the second sub-pixel, the third ideal angle φ3 of the third sub-pixel having the third highest luminance among the sub-pixels of each unit pixel PX. In this case, the following Equations (5) to (8) can be used in place of the Equation (1) to (4) provided above.

$$\theta=(\varphi_1+\varphi_2+\varphi_2)/3 \quad (5)$$

$$\theta=(B_1\cdot\varphi_1+B_2\cdot\varphi_2+B_3\cdot\varphi_3)/(B_1+B_2+B_3) \quad (6)$$

$$\theta=(C_1\cdot\varphi_1+C_2\cdot\varphi_2+C_3\cdot\varphi_3)/(C_1+C_2+C_3) \quad (7)$$

$$\theta=(B_1\cdot C_1\cdot\varphi_1+B_2\cdot C_2\cdot\varphi_2+B_3\cdot C_3\cdot\varphi_3)/(B_1\cdot C_1+B_2\cdot C_2+B_3\cdot C_3) \quad (8)$$

In these Equations, $B_3$ represents the luminance of the third sub-pixel (the third luminance) and $C_3$ represents a coefficient different from luminance $B_3$ (the third coefficient). As coefficient $C_3$, various parameters regarding the third sub-pixel, apart from the luminance $B_3$, for example, the width of the third sub-pixels in the first direction X or the second direction Y or the number of the third sub-pixels contained in unit pixel PX, can be used.

As described above, even if the angle of inclination θ is determined in consideration of ideal angles φ of three or more types of sub-pixels, the moiré which might have resulted from the first prism sheet 14 or second prism sheet 15 and the display area DA can be suppressed.

(Second Embodiment)

The second embodiment will now be described. This embodiment discloses other methods of reducing or preventing the moiré produced by interference between the display area DA and the first prism sheet 14 or second prism sheet 15. The structures, operations and the like of this embodiment are similar to those of the first embodiment unless particularly referred to.

FIG. 14 schematically shows a first prism sheet 14 in which prisms 14*a* are arranged and a display area DA in which unit pixels PX are arranged. Prisms 14*a* are each extending linearly along third extending direction D1 (third direction) and arranged at first prism pitch $P_1$ parallel to each other. In the example of FIG. 14, the first extending direction D1 is the same as the second direction Y. That is, the angle of inclination θ is 0°.

The moiré which might have resulted from interference between prisms 14*a* of the first prism sheet 14 and various types of sub-pixels contained in unit pixels PX can be suppressed by arranging prisms 14*a* at ideal pitches Q each specific to each respective sub-pixel. The ideal pitches Q are, for example, those which make the luminances of sub-pixels most uniform in the display area DA on the whole.

The ideal pitches Q become equal among various types of sub-pixels if the sub-pixels contained in unit pixels PX are the same in shape and the same number of sub-pixels are contained in each unit pixel PX. Therefore, the moiré can be suppressed by setting this pitch to the first prism pitch $P_1$.

Note that the ideal pitch Q for the case where various types of sub-pixels contained in unit pixels PX are the same in shape and the same number of sub-pixels are contained in each unit pixel PX will be a value obtained by multiplying the width of the sub-pixels with a natural number, or dividing it a natural number. This is because if the ideal pitch Q takes such a value, the spatial relationships between the shade of each prism 14*a* and each respective sub-pixel are made uniform on the screen on the whole and luminance distribution is equalized.

Figure 15:
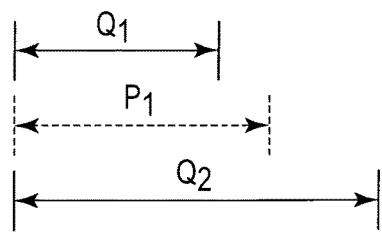
FIG. 15 is a diagram illustrating an example of a procedure which determines the prism pitch according to the second embodiment.

On the other hand, when at least some of sub-pixels PXR, PXG, PXB and PXW differ in shape from each other in each unit pixel PX or the number of sub-pixels of one type is different from the number of those of another type in each unit pixels PX as in the first to fourth structural examples, ideal pitches Q of the sub-pixels do not become the same. In this case, the first prism pitch $P_1$ should be determined. FIG. 15 shows an example of such a procedure of determining the first prism pitch $P_1$.

[Procedure 1]

First, the first sub-pixel having the highest luminance and the second sub-pixel having the second highest luminance are selected from the various types of sub-pixels PXR PXG, PXB and PXW. Then, first ideal pitch $Q_1$, which is an ideal pitch Q for the first sub-pixel and second ideal pitch $Q_2$, which is an ideal pitch Q for the second sub-pixel are determined. FIG. 15 shows an example in which first ideal pitch $Q_1$ is less than second ideal pitch $Q_2$, but, in some other cases, first ideal pitch $Q_1$ may be greater than second ideal pitch $Q_2$.

Ideal pitch $Q_1$ and $Q_2$ can be determined, for example, by computer simulation. In this simulation, for example, a first model of the pattern produced in the light which passed prisms 14*a*, and a second model of the pattern produced in the light which passed the display area DA in which only one type of the first sub-pixels and the second sub-pixels to be subjected to operation are arranged while superimposed one on another on a virtual plane. Then, the degree of occurrence of moiré (that is, the presence/absence or strength of moiré, etc) is evaluated by changing the first prism pitch $P_1$. The evaluation may be carried out by the naked eye while displaying the first model and second model on the screen, or by calculation of the luminance distribution appearing on the overlaid first model and second model. In such an evaluation, the pitch of prism 14*a* by which moiré is inhibited most (pitch by which luminance distribution is made most uniform) is defined as the ideal pitch Q for the sub-pixel subjected to operation. By carrying out such a simulation and evaluation for both the first sub-pixel and second sub-pixel, ideal pitches $Q_1$ and $Q_2$ can be determined.

[Procedure 2]

Then, the first prism pitch $P_1$ is determined based on each of ideal pitches $Q_1$ and $Q_2$ determined in Procedure 1. The first prism pitch $P_1$ can be defined, for example, between ideal pitches $Q_1$ and $Q_2$ ($Q_1<P_1<Q_2$ or $Q_2<P_1<Q_1$).

Near first ideal pitch $Q_1$, the moiré produced by interference between the first sub-pixel and prisms 14*a* is suppressed further as the first prism pitch $P_1$ becomes closer to the first ideal pitches $Q_1$. Similarly, near second ideal pitch $Q_2$, the moiré produced by interference between the second sub-pixel and prisms 14*a* is suppressed further as the first prism pitch $P_1$ becomes closer to the second ideal pitch $Q_2$. Therefore, if the first prism pitch $P_1$ is defined between ideal pitches $Q_1$ and $Q_2$, the moiré produced by interference between prisms 14*a* and the display area DA is suppressed on the whole as compared to the case where the first prism pitch $P_1$ is defined outside this range.

In addition, as the luminance of the sub-pixel is higher, the noticeability of moiré produced by interference between the sub-pixel and prism 14*a* becomes high. Therefore, by determining the first prism pitch $P_1$ using the ideal pitches $Q_1$ and $Q_2$ for the first sub-pixel and the second sub-pixel, which have high luminance, it becomes possible to effectively suppress the occurrence of highly noticeable moirés.

As an example, the first prism pitch $P_1$ can be obtained by simply averaging the ideal pitches $Q_1$ and $Q_2$ as indicated in the following Equation (9).

$$P_1=(Q_1+Q_2)/2 \tag{9}$$

As another example, the first prism pitch $P_1$ can be obtained by weighted average using luminance $B_1$ of the first sub-pixel (the first luminance) and luminance $B_2$ of the second sub-pixel (the second luminance) as indicated in the following Equation (10). With use of the weighted average according to luminance, the first prism pitch $P_1$ can be determined to be closer to the ideal pitch Q of a sub-pixel with a highly noticeable moiré (sub-pixel with high luminance) and thus the moiré which might have resulted from the sub-pixel can be suppressed with priority.

$$P_1=(B_1 \cdot Q_1+B_2 \cdot Q_2)/(B_1+B_2) \tag{10}$$

The weighted average may be carried out using coefficient $C_1$ (first coefficient) and coefficient $C_2$ (second coefficient) other than the luminance $B_1$ or $B_2$ as in the Equation (11) below. As the coefficient C1, various parameters regarding the first sub-pixel can be used, apart from the luminance $B_1$. Examples of these parameters are the width of the first sub-pixel in the first direction X or second direction Y, and the number of the first sub-pixels contained in the unit pixel PX. As the coefficient $C_2$, various parameters regarding the second sub-pixel can be used, apart from the luminance $B_2$. Examples of these parameters are the width of the second sub-pixel in the first direction X or second direction Y, and the number of the second sub-pixels contained in the unit pixel PX.

$$P_1=(C_1 \cdot Q_1+C_2 \cdot Q_2)/(C_1+C_2) \tag{11}$$

The weighted average may be carried out using the values obtained by multiplying coefficient $C_1$ with luminance $B_1$ and coefficient $C_2$ with luminance $B_2$ as in the Equation (12) below.

$$P_1=(B_1 \cdot C_1 \cdot Q_1+B_2 \cdot C_2 \cdot Q_2)/(B_1 \cdot C_1+B_2 \cdot C_2) \quad (12)$$

Here, an example how to determine the first prism Pitch $P_1$ will be described below. That is, as to a display area DA in which the sub-pixel PXW had the highest luminance and the sub-pixel PXG had the second highest luminance, the first prism pitch $P_1$ was determined using the Equation (10) above. Then, the moiré, resulting from the first prism sheet 14 in which prisms 14a are arranged at this pitch and the display area DA, was evaluated.

The ratio of the luminance $B_1$ of the sub-pixel PXW which is the first sub-pixel and the luminance $B_2$ of the sub-pixel PXG which is the second sub-pixel is expressed as: $B_1:B_2=1.5:1$. In Procedure 1 described above, the ideal pitch $Q_1$ of the sub-pixel PXW and the ideal pitch $Q_2$ of the sub-pixel PXG by were obtained by simulation, and the first ideal pitch $Q_1$ was 30 μm and the second ideal pitch $Q_2$ was 15 μm.

In this case, by the Equation (10) provided above, $P_1=(1.5 \cdot 30+1 \cdot 15)/(1.5+1)=24$ μm is obtained. When the first prism sheet 14 in which prisms 14a were arranged at the first prism pitch $P_1$ thus determined (=24 μm) was used, moiré was substantially not noticeable. In addition, under various conditions, the evaluation of moiré was carried out for first prism pitches $P_1$ determined using the Equations (9) to (12). In each case, the result indicated that the moiré was appropriately suppressed.

Note that in this embodiment, the first prism pitch $P_1$ is determined using the first ideal pitch $Q_1$ of the first sub-pixel with the highest luminance and the second ideal pitch $Q_2$ of the second sub-pixel with the second highest luminance. But it is also possible to determine the first prism pitch $P_1$ using ideal pitches Q of more sub-pixels. In other words, assuming that unit pixels PX each comprise n-types (n>=2) of sub-pixels, the first prism pitch $P_1$ can be determined based on the ideal pitches Q of 2 or more but n or less types of sub-pixels.

For example, the first prism pitch $P_1$ may be determined using, in addition to the first sub-pixel and the second sub-pixel, the third ideal pitch $Q_3$ of the third sub-pixel having the third highest luminance among the sub-pixels of each unit pixel PX. In this case, the following Equations (13) to (16) can be used in place of the Equation (9) to (12) provided above.

$$P_1=(Q_1+Q_2+Q_3)/3 \quad (13)$$

$$P_1=(B_1 \cdot Q_1+B_2 \cdot Q_2+B_3 \cdot Q_3)/(B_1+B_2+B_3) \quad (14)$$

$$P_1=(C_1 \cdot Q_1+C_2 \cdot Q_2+C_3 \cdot Q_3)/(C_1+C_2+C_3) \quad (15)$$

$$P_1=(B_1 \cdot C_1 \cdot Q_1+B_2 \cdot C_2 \cdot Q_2+B_3 \cdot C_3 \cdot Q_3)/(B_1 \cdot C_1+B_2 \cdot C_2+B_3 \cdot C_3) \quad (16)$$

In these Equations, $B_3$ represents the luminance of the third sub-pixel (the third luminance) and $C_3$ represents a coefficient different from luminance $B_3$ (the third coefficient). As coefficient $C_3$, various parameters regarding the third sub-pixel can be used apart from the luminance $B_3$. Examples of these parameters are the width of the third sub-pixels in the first direction X or the second direction Y and the number of the third sub-pixels contained in unit pixel PX.

Figure 16:
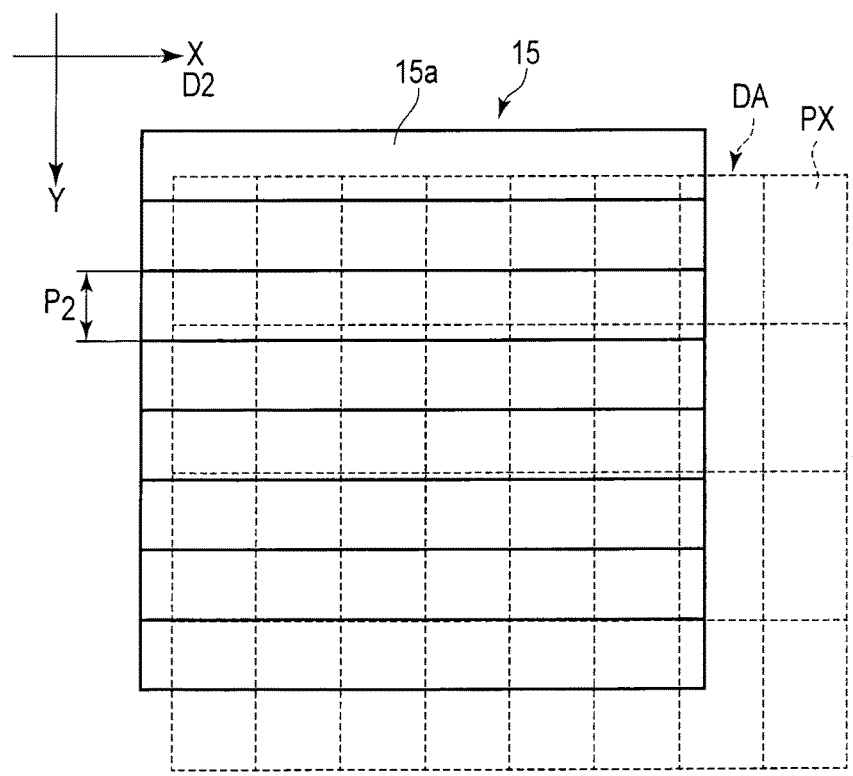
FIG. 16 is a diagram schematically showing a second prism sheet in which prisms are arranged, and a display area in which unit pixels are arranged, according to the second embodiment.

Note that the pitch of prisms 15a of the second prism sheet 15 can be defined by a method similar to the above. FIG. 16 schematically shows the second prism sheet 15 in which prisms 15a are arranged and the display area DA in which unit pixels PX ware arranged. Prisms 15a are each extending linearly along the second extending direction D2 and arranged at second prism pitch $P_2$ parallel to each other. As shown in FIG. 14, when the first extending direction D1 of prisms 14a coincides with the second direction Y and the first extending direction D1 is perpendicular to the second extending direction D2, the second extending direction D2 coincides with the first direction X.

The moiré which might have resulted from prisms 15a and various types of sub-pixels contained in unit pixels PX can be suppressed by arranging prisms 15a at ideal pitches Q each specific to each respective sub-pixel, as in the case of prisms 14a. The second prism pitch $P_2$ can be determined by Procedures 1 and 2 similar to those of first prism pitch $P_1$ using ideal pitches Q for the sub-pixels of various types.

As explained above, according to this embodiment, moiré caused by interference between the display area DA and the first prism sheet 14 or the second prism sheet 15 can be suppressed in the liquid crystal display 1 even if at least some of sub-pixels differ in shape from each other in each unit pixel PX or the number of sub-pixels of one type is different from the number of those of another type in each unit pixels PX among those arranged in the display area DA.

Note that the structures disclosed in the first and second embodiments can be modified into various versions when practiced. Further, regarding the present embodiments, any advantages and effects of those obvious from the description of the specification or arbitrarily conceived by a skilled person are naturally considered achievable by the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of suppressing moiré in a display device comprising:
   a display panel comprising a display area in which first pixels and second pixels are arranged along a first direction and a second direction intersecting the first direction;
   a light source;
   a light guide comprising an end portion opposing the light source;
   a prism sheet interposed between the light guide and the display panel and comprising a plurality of prisms extending along a third direction, wherein
   each of the first pixels includes a first red sub-pixel, a first green sub-pixel and a blue sub-pixel,
   each of the second pixels includes a second red sub-pixel, a second green sub-pixel and a white sub-pixel,
   the moiré being caused by interference between the prisms and the display area, and the method of suppressing the moiré comprising:
   determining for a first sub-pixel a first ideal angle between the extending direction of the prisms and the second direction, by which a luminance distribution of the sub-pixels in the display area is in a most uniform state, the first ideal angle being specific to the first sub-pixel having a highest luminance among the first red sub-pixel, the second red sub-pixel, the first green sub-pixel, the second green sub-pixel, the blue sub-pixel and the white sub-pixel;

determining for a second sub-pixel a second ideal angle between the extending direction of the prisms and the second direction, by which the luminance distribution of the sub-pixels in the display area is in a most uniform state, the second ideal angle being specific to the second sub-pixel having a second highest luminance among the first red sub-pixel, the second red sub-pixel, the first green sub-pixel, the second green sub-pixel, the blue sub-pixel and the white sub-pixel, wherein the second ideal angle is different from the first ideal angle, and one of the first sub-pixel and the second sub-pixel is the white sub-pixel; and inclining the third direction with respect to the second direction by an angle of inclination that is an average of the first ideal angle and the second ideal angle.

2. The method of claim 1 wherein the average is a weighted average according to a first luminance of the first sub-pixel and a second luminance of the second sub-pixel.

3. The method of claim 1, wherein the average is a weighted average according to a value obtained by multiplying the first luminance of the first sub-pixel with a first coefficient other than the first luminance regarding the first sub-pixel and a value obtained by multiplying the second luminance of the second sub-pixel with a second coefficient other than the second luminance regarding the second sub-pixel.

4. A method of suppressing moiré in a display device comprising:

a display panel comprising a display area in which first pixels and second pixels are arranged along a first direction and a second direction intersecting the first direction;

a light source;

a light guide comprising an end portion opposing the light source;

a prism sheet interposed between the light guide and the display panel and comprising a plurality of prisms linearly extending, wherein each of the first pixels includes a first red sub-pixel, a first green sub-pixel and a blue sub-pixel, each of the second pixels includes a second red sub-pixel, a second green sub-pixel and a white sub-pixel, the moiré being caused by interference between the prisms and the display area, and the method of suppressing the moiré comprising:

determining for a first sub-pixel a first ideal pitch between the prisms, by which a luminance distribution of the sub-pixels in the display area is in a most uniform state, the first ideal pitch being specific to the first sub-pixel having a highest luminance among the first red sub-pixel, the second red sub-pixel, the first green sub-pixel, the second green sub-pixel, the blue sub-pixel and the white sub-pixel;

determining for a second sub-pixel a second ideal pitch between the prisms, by which the luminance distribution of the sub-pixels in the display area is in a most uniform state, the second ideal pitch being specific to the second sub-pixel having a second highest luminance among the first red sub-pixel, the second red sub-pixel, the first green sub-pixel, the second green sub-pixel, the blue sub-pixel and the white sub-pixel, wherein the second ideal pitch is different from the first ideal pitch, and one of the first sub-pixel and the second sub-pixel is the white sub-pixel; and arranging the prisms on the prism sheet at a prism pitch that is an average of the first ideal pitch and the second ideal pitch.

5. The method of claim 4, wherein the average is a weighted average according to a first luminance of the first sub-pixel and a second luminance of the second sub-pixel.

6. The method of claim 4, wherein the average is a weighted average according to a value obtained by multiplying the first luminance of the first sub-pixel with a first coefficient other than the first luminance regarding the first sub-pixel and a value obtained by multiplying the second luminance of the second sub-pixel with a second coefficient other than the second luminance regarding the second sub-pixel.

* * * * *